US012561826B2

(12) United States Patent　　　　　(10) Patent No.:　US 12,561,826 B2
Liu et al.　　　　　　　　　　　　　　　(45) Date of Patent:　　Feb. 24, 2026

(54) METHOD, DEVICE, AND COMPUTER PROGRAM PRODUCT FOR DETERMINING CAMERA POSE FOR AN IMAGE

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 18/319,577

(22) Filed: May 18, 2023

(65) Prior Publication Data

US 2024/0346680 A1　　Oct. 17, 2024

(30) Foreign Application Priority Data

Apr. 13, 2023　　(CN) ......................... 202310395280.X

(51) Int. Cl.
　　*G06T 7/70*　　　　　(2017.01)
　　*G06F 16/583*　　　　(2019.01)
　　　　　　　(Continued)

(52) U.S. Cl.
　　CPC .............. *G06T 7/70* (2017.01); *G06F 16/583* (2019.01); *G06T 17/00* (2013.01); *G06V 10/44* (2022.01);
　　　　　　　(Continued)

(58) Field of Classification Search
None
See application file for complete search history.

(56) References Cited

U.S. PATENT DOCUMENTS

2014/0293016 A1*　10/2014　Benhimane ............. G06T 7/246
　　　　　　　　　　　　　　　　　　　348/50
2016/0275079 A1*　9/2016　Kluckner .................. G06T 7/74
　　　　　　　　(Continued)

OTHER PUBLICATIONS

Cheng, W., Lin, W., Chen, K., & Zhang, X. (2019). Cascaded Parallel Filtering for Memory-Efficient Image-Based Localization. 2019 IEEE/CVF International Conference on Computer Vision (ICCV), 1032-1041. https://doi.org/10.1109/ICCV.2019.00112. (Year: 2019).*

(Continued)

*Primary Examiner* — Amandeep Saini
*Assistant Examiner* — Caroline Tabancay Duffy
(74) *Attorney, Agent, or Firm* — Ryan, Mason & Lewis, LLP

(57)　　　　　　　ABSTRACT

Embodiments of the present disclosure relate to a method, a device, and a computer program product for determining a camera pose for an image. The method includes: acquiring a query image for a target object. The method further includes: acquiring a set of images from a three-dimensional model for the target object. The method further includes: selecting a target image from the set of images based on similarities between images in the set of images and the query image. The method further includes: determining a target camera pose corresponding to the query image based on a camera pose for the target image. The method enables fast and accurate determination of a camera pose for a query image from a three-dimensional model for a target object, thus increasing the efficiency of acquiring the camera pose and improving the user experience.

20 Claims, 8 Drawing Sheets

(51) Int. Cl.
| | |
|---|---|
| *G06T 17/00* | (2006.01) |
| *G06V 10/44* | (2022.01) |
| *G06V 10/74* | (2022.01) |

(52) U.S. Cl.
CPC .. *G06V 10/761* (2022.01); *G06T 2207/30244* (2013.01)

(56) References Cited

U.S. PATENT DOCUMENTS

| | | | |
|---|---|---|---|
| 2018/0373933 A1* | 12/2018 | Ghinamo | G01C 21/005 |
| 2019/0005718 A1* | 1/2019 | Zhou | G06V 10/757 |
| 2020/0143565 A1* | 5/2020 | Festa | G06T 19/006 |
| 2021/0158556 A1* | 5/2021 | Wu | G06T 7/73 |
| 2023/0230275 A1* | 7/2023 | Lin | G06T 7/70 |
| | | | 382/103 |

OTHER PUBLICATIONS

B. Mildenhall et al., "NeRF: Representing Scenes as Neural Radiance Fields for View Synthesis," European Conference on Computer Vision, Aug. 2020, 17 pages.

T. Müller et al., "Instant Neural Graphics Primitives with a Multiresolution Hash Encoding," arXiv:2201.05989v2, May 4, 2022, 15 pages.

J. T. Barron et al., "Mip-NeRF 360: Unbounded Anti-Aliased Neural Radiance Fields," Conference on Computer Vision and Pattern Recognition, arXiv:2111.12077v3, Mar. 25, 2022, 18 pages.

G. Gafni et al., "Dynamic Neural Radiance Fields for Monocular 4D Facial Avatar Reconstruction," IEEE/CVF Conference on Computer Vision and Pattern Recognition, Jun. 2021, pp. 8649-8658.

S. Liu et al., "Editing Conditional Radiance Fields," International Conference on Computer Vision, arXiv:2105.06466v2, Jun. 4, 2021, 24 pages.

C. Wang et al., "Clip-NeRF: Text-and-Image Driven Manipulation of Neural Radiance Fields," arXiv:2112.05139v3, Mar. 2, 2022, 13 pages.

A. Radford et al., "Learning Transferable Visual Models From Natural Language Supervision," International Conference on Machine Learning, arXiv:2103.00020v1, Feb. 26, 2021, 48 pages.

S. Zhi et al., "In-Place Scene Labelling and Understanding with Implicit Scene Representation," International Conference on Computer Vision, arXiv:2103.15875v2, Aug. 21, 2021, 14 pages.

S. Kobayashi et al., "Decomposing NeRF for Editing via Feature Field Distillation," arXiv:2205.15585v1, May 31, 2022, 23 pages.

J. L. Schonberger et al., "Structure-from-Motion Revisited," IEEE Conference on Computer Vision and Pattern Recognition (CVPR), Jun. 2016, pp. 4104-4113.

W. Cheng et al., "Cascaded Parallel Filtering for Memory-Efficient Image-Based Localization," IEEE/CVF International Conference on Computer Vision (ICCV), Nov. 2019, pp. 1032-1041.

D. Campbell et al., "Solving the Blind Perspective-n-Point Problem End-To-End With Robust Differentiable Geometric Optimization," arXiv:2007.14628v2, Sep. 8, 2020, 18 pages.

B. Li et al., "Language-driven Semantic Segmentation," International Conference on Learning Representations, arXiv:2201.03546v2, Apr. 3, 2022, 13 pages.

M. Caron et al., "Emerging Properties in Self-Supervised Vision Transformers," IEEE/CVF Conference on Computer Vision and Pattern Recognition. Jun. 2021, pp. 9650-9660.

U.S. Appl. No. 17/984,474 filed in the name of Zhisong Liu et al., filed Nov. 10, 2022, and entitled "Method, Electronic Device, and Computer Program Product for Generating Three-Dimensional Scene."

* cited by examiner

900

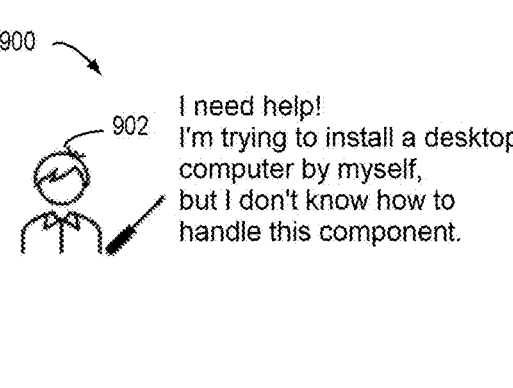

I need help!
I'm trying to install a desktop computer by myself, but I don't know how to handle this component.

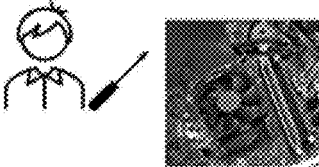

Here is the picture

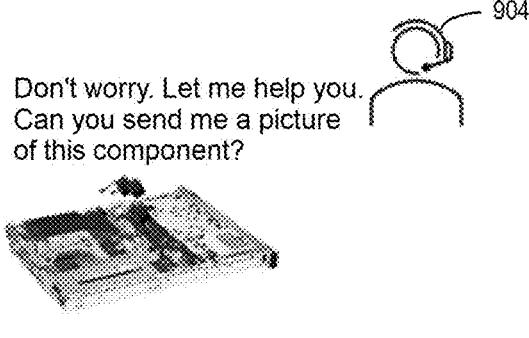

Don't worry. Let me help you. Can you send me a picture of this component?

I am matching your picture with our three-dimensional model of this desktop computer. Please wait two seconds.

We found it. This component should be placed in the marked area.

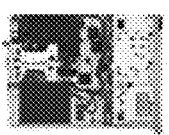

FIG. 9

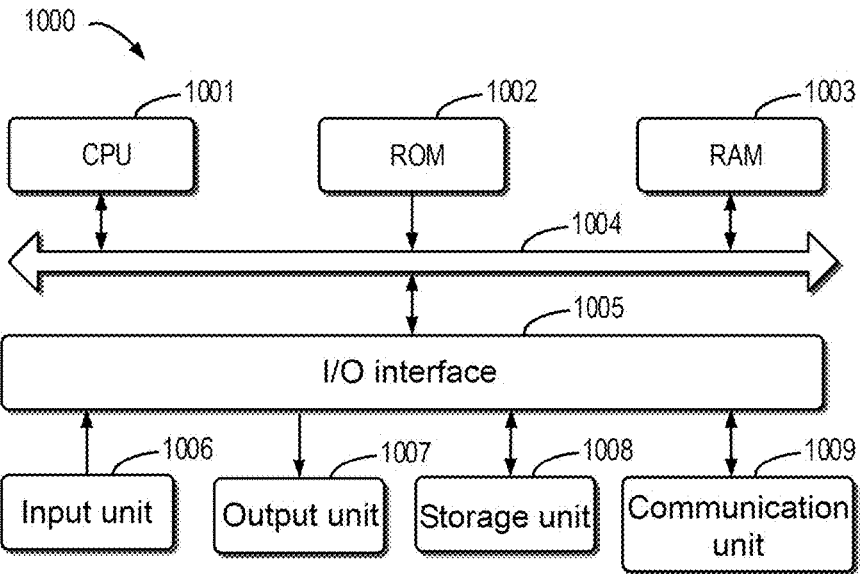

FIG. 10

METHOD, DEVICE, AND COMPUTER PROGRAM PRODUCT FOR DETERMINING CAMERA POSE FOR AN IMAGE

RELATED APPLICATION

The present application claims priority to Chinese Patent Application No. 202310395280.X, filed Apr. 13, 2023, and entitled "Method, Device, and Computer Program Product for Determining Camera Pose for an Image," which is incorporated by reference herein in its entirety.

FIELD

Embodiments of the present disclosure relate generally to the field of image processing, and specifically to a method, a device, and a computer program product for determining a camera pose for an image.

BACKGROUND

With the development of computer technology, there are more and more applications involving image processing, which increases the demand for image processing. For example, in applications involving virtual worlds, people are beginning to enter a new era of image display. For the processing of images such as those in virtual worlds, it is possible to implement learning from a two-dimensional image of an object to obtain a three-dimensional structure of that object.

In this process, for example, the Structure from Motion (SFM) technique can be used for three-dimensional reconstruction from two-dimensional images. In addition, a neural radiance field (NeRF) model, for example, is also used to process images. The NeRF model mainly reconstructs a three-dimensional representation of an object by synthesizing images of the same object from different angles of view. An image in this camera pose can then be synthesized by inputting different camera poses at the time of inference.

SUMMARY

Embodiments of the present disclosure provide a method, a device, and a computer program product for determining a camera pose for an image.

According to a first aspect of the present disclosure, a method for determining a camera pose for an image is provided. The method includes: acquiring a query image for a target object. The method further includes: acquiring a set of images from a three-dimensional model for the target object. The method further includes: selecting a target image from the set of images based on similarities between images in the set of images and the query image. The method further includes: determining a target camera pose corresponding to the query image based on a camera pose for the target image.

According to a second aspect of the present disclosure, an electronic device is provided. The electronic device includes at least one processor; and a memory coupled to the at least one processor and having instructions stored thereon, wherein the instructions, when executed by the at least one processor, cause the electronic device to execute actions including: acquiring a query image for a target object; acquiring a set of images from a three-dimensional model for the target object; selecting a target image from the set of images based on similarities between images in the set of images and the query image; and determining a target camera pose corresponding to the query image based on a camera pose for the target image.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, wherein identical reference numerals generally represent identical components in the example embodiments of the present disclosure.

FIG. 9 is a schematic diagram of a usage example of a three-dimensional model according to embodiments of the present disclosure; and FIG. 10 is a block diagram of an example device suitable for implementing embodiments of the present disclosure.

In the accompanying drawings, identical or corresponding numerals represent identical or corresponding parts.

DETAILED DESCRIPTION

Figure 1:
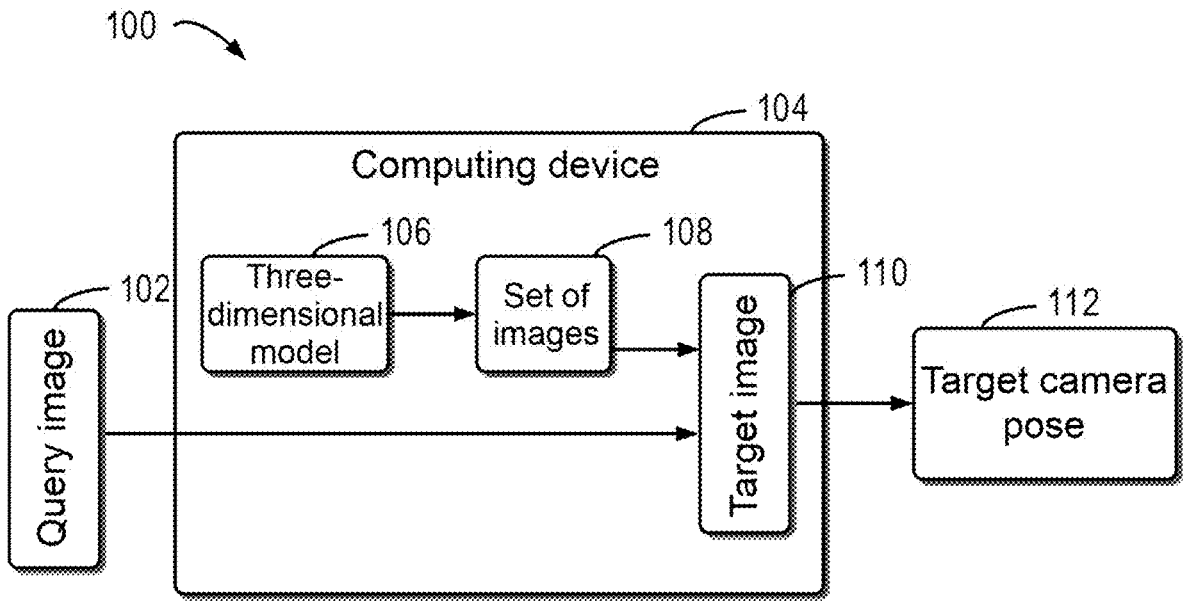
FIG. 1 is a schematic diagram of an example environment in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first." "second," and the like may refer to different or identical objects. Other explicit and implicit definitions may also be included below.

As noted above, there are many issues that need to be addressed in the generation and use of a three-dimensional model of an object. For example, an SFM technique may be used to implement three-dimensional reconstruction from motion, that is, to extrapolate three-dimensional information from a time series of two-dimensional images. As another example, a NeRF model may be used to synthesize images of the same scene from different angles of view, and it reconstructs, based on several images of a given scene, a three-dimensional representation of this scene. An image in this camera pose can be synthesized, also referred to as "rendered," by inputting different camera poses at the time of inference. However, these two techniques are used separately in the conventional solutions, and the SFM technique is not combined into the NeRF model to achieve end-to-end optimization. In addition, the use of the NeRF model in conventional solutions is still at the research stage and does not provide further services for users, for example, how to find an image corresponding to an input query image from a three-dimensional model for the object for the user to use.

At least to address the above and other potential problems, embodiments of the present disclosure provide a method for determining a camera pose for an image. In this method, a computing device acquires a query image for a target object. The computing device then also acquires a set of images from a three-dimensional model for the target object. Next, the computing device determines similarities between images in the set of images and the query image. Then, based on the similarities, the computing device selects a target image from the set of images. Finally, the computing device determines a target camera pose corresponding to the query image based on a camera pose for the target image. The method enables fast and accurate determination of a camera pose for a query image from a three-dimensional model for a target object, thus increasing the efficiency of acquiring the camera pose and improving the user experience. Further, a reference image obtained from this target camera pose can be provided to the user to provide the user with information about the difference between the query image and the reference image, thereby providing services to the user.

Illustrative embodiments of the present disclosure will be further described in detail below with reference to the accompanying drawings, wherein FIG. 1 shows an example environment 100 in which a device and/or a method according to embodiments of the present disclosure can be implemented.

As shown in FIG. 1, the example environment 100 includes a computing device 104, the computing device 104 being used to determine a target camera pose 112 corresponding to an input query image 102. The example computing device 104 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like.

The query image 102 is an image for a target object. For example, the query image 102 is an image obtained by taking a picture of the target object using a camera. The query image 102 includes the target object. The target object includes a scene, an object, and so on. FIG. 1 illustrates that the computing device 104 receives the query image 102, which is only an example and not a specific limitation to the present disclosure, and the query image 102 may also be stored in the computing device 104.

After acquiring the query image 102, the computing device 104 may acquire a three-dimensional model 106 for the target object in the query image 102. In some embodiments, upon obtaining the query image 102, identification information for the target object in the query image 102 may also be obtained, so as to find the corresponding three-dimensional model based on the identification information, such as the identification information for the target object provided by a user. In some embodiments, the computing device 104 may identify the query image 102, acquire the target object in the image, and then look up the three-dimensional model corresponding to the identified target object from a repository. The above examples are only used for describing the present disclosure, and are not intended to specifically define the present disclosure. A person skilled in the art can obtain a three-dimensional model corresponding to the target object in the query image in any suitable manner as needed.

The computing device 104 may acquire a set of images 108 from the three-dimensional model 106 when determining a target camera pose corresponding to the query image 102. For example, when this three-dimensional model 106 is a NeRF model for the target object, a set of images is acquired from the horizontal 360-degree circumference of the target object. For example, this set of images is acquired at multiple locations within the horizontal circumference at the same angular interval, such as acquiring one image every 90 degrees. In this case, four images will be acquired within the horizontal circumference. Then, a target image 110 is further acquired based on the set of images 108 and the query image 102. This target image is an image with a very high similarity with the query image. Then, the camera pose for the target image 110 and the query image 102 are used to determine a target camera pose 112 corresponding to the query image 102. For example, this target camera pose 112 is the pose used to take the query image. Alternatively, the camera pose may include a camera position, a camera shooting angle, and so on.

In some embodiments, the computing device 104 may also be used to generate a three-dimensional model for the target object. The computing device 104 may acquire a plurality of images for the target object. The plurality of images are first processed to obtain a three-dimensional point cloud for the target object. The three-dimensional point cloud for the target object is then used to obtain a three-dimensional model for the target object. For example, the three-dimensional point cloud for the target object is subjected to NeRF modeling to obtain a three-dimensional model for the target object. Additionally, the user can acquire the corresponding image from the three-dimensional model by using the input camera pose data. In some embodiments, the computing device 104 receives the three-dimensional model for the target object from other computing devices. The three-dimensional model for the target object is acquired through training in other computing devices using a plurality of acquired images of the target scene. The above examples are only used for describing the present disclosure, and are not intended to specifically define the present disclosure.

The method enables fast and accurate determination of a camera pose for a query image from a three-dimensional model for a target object, thus increasing the efficiency of acquiring the camera pose and improving the user experience.

An example environment in which a device and/or a method according to embodiments of the present disclosure can be implemented has been described above in conjunction with FIG. 1. A schematic diagram of an example process for generating and using a three-dimensional model according to embodiments of the present disclosure is described below in conjunction with FIG. 2. This example process may be performed on the computing device 104 in FIG. 1 or any suitable computing device.

Figure 2:
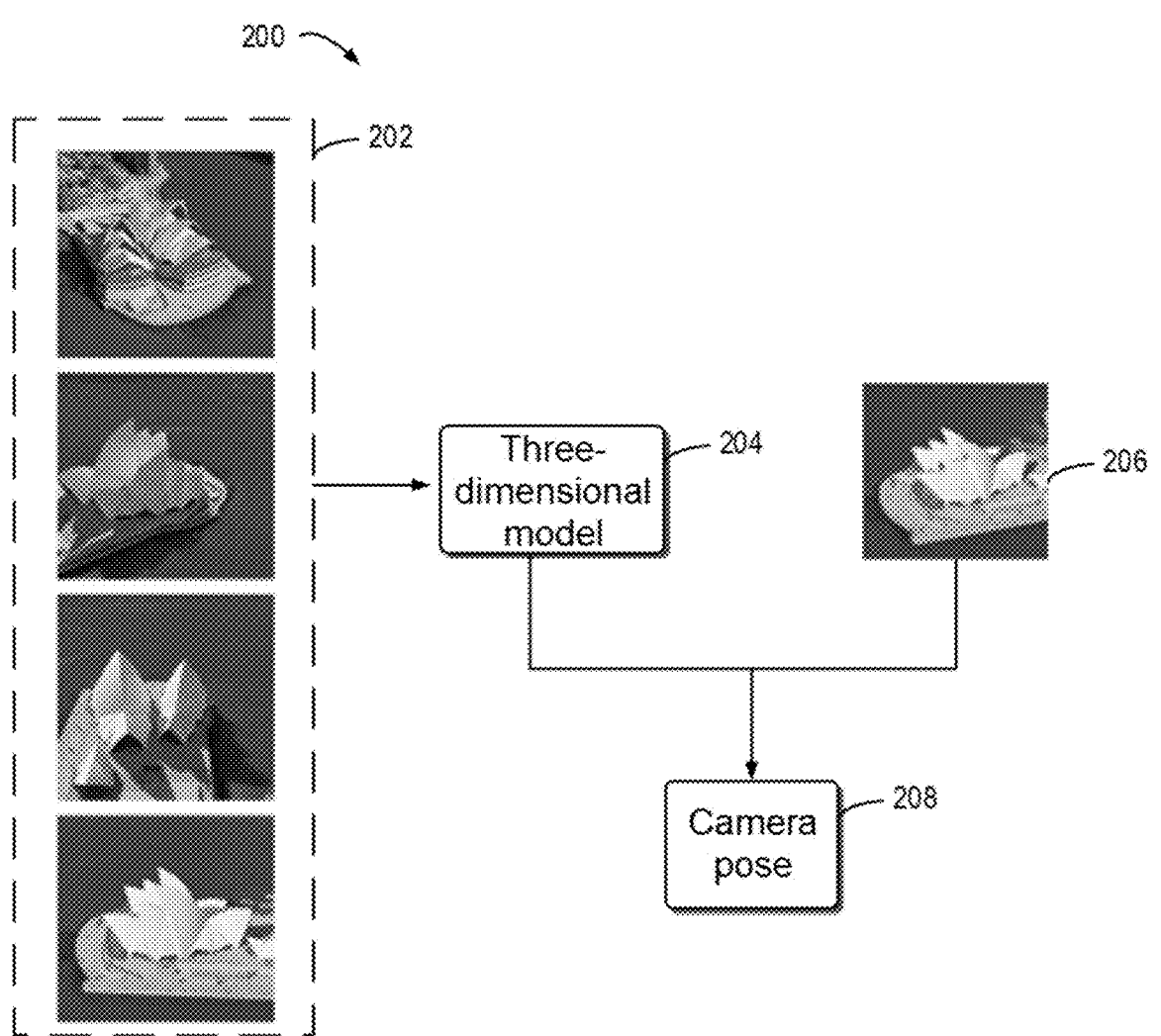
FIG. 2 is a schematic diagram of an example process for generating and using a three-dimensional model according to embodiments of the present disclosure.

In the example process 200 of FIG. 2, a plurality of images 202 for the target object are used to acquire a three-dimensional model 204 for the target object, such as the Sydney Opera House. In this process, an SFM method can be used first to process the plurality of images to obtain a three-dimensional point cloud for the target object, and then the three-dimensional point cloud is modeled to obtain a three-dimensional model 204 for the target object, such as a NeRF model.

After acquiring the three-dimensional model 204 for the target object, a query image 206 can be acquired, wherein the query image 206 is an image newly taken for this target object. The three-dimensional model 204 and the query image are then further processed to obtain a camera pose 208 for the time when the query image 206 is taken. The processes for generating the three-dimensional model and acquiring the camera pose will be described in detail below.

The method enables the generation of an end-to-end three-dimensional model, and enables fast and accurate determination of the camera pose for the query image from the three-dimensional model for the target object, thus increasing the efficiency of acquiring the camera pose and improving the user experience.

Figure 3:
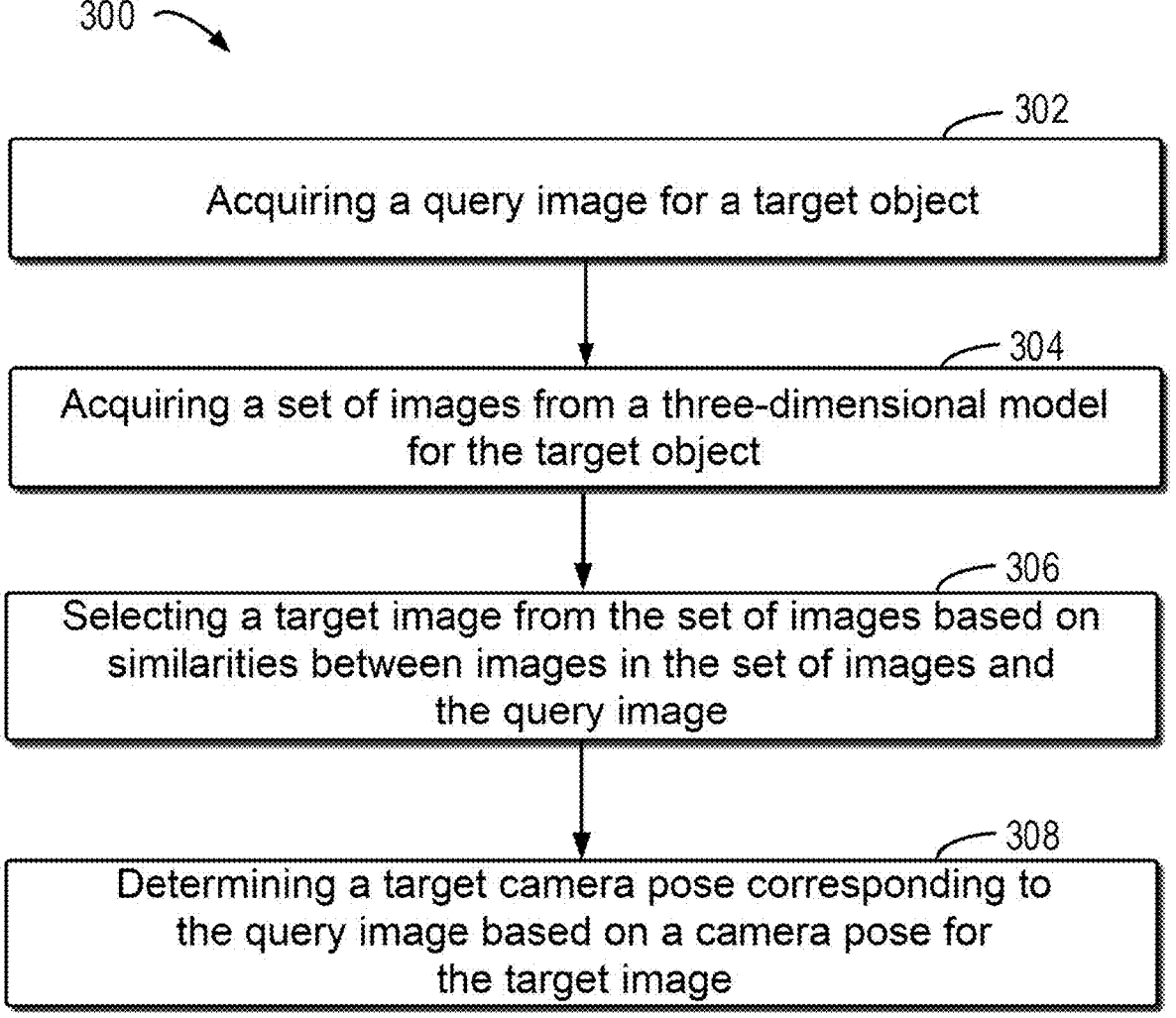
FIG. 3 is a flow chart of a method for determining a camera pose for an image according to embodiments of the present disclosure.

A schematic diagram of an example process for generating and using a three-dimensional model according to embodiments of the present disclosure has been described above in conjunction with FIG. 2, and a flow chart of a method 300 for determining a camera pose for an image according to embodiments of the present disclosure will be described below in conjunction with FIG. 3. The method 300 in FIG. 3 may be performed on the computing device 104 in FIG. 1 or any suitable computing device.

At block 302, a query image for a target object is acquired. For example, the computing device 104 may receive the query image 102, and then the computing device 104 is used to process the query image. The computing device may receive the query image from a user or other computing devices. For example, the query image 102 may be an image taken by the user for the target object.

At block 304, a set of images is acquired from a three-dimensional model for the target object. For example, after acquiring the query image, in order to determine a target camera pose corresponding to the query image, the computing device 104 acquires a three-dimensional model for the target object to which the query image 102 is directed. The computing device then acquires a set of images from this three-dimensional model.

In some embodiments, when obtaining the query image 102, identification information for the target object in the query image 102 may also be obtained, so as to find the corresponding three-dimensional model based on the identification information.

In some embodiments, when acquiring the set of images, the computing device 104 extracts the target object in the query image 102. For example, an image recognition algorithm is used to extract the target object in the query image 102. The computing device 104 then looks up a three-dimensional model corresponding to the target object based on that target object. The computing device 104 may acquire a set of images of the target object from the three-dimensional model, the set of images being images of the target object viewed from the surroundings of the target object. For example, the user may acquire a set of images for the target object from a number of points within the horizontal circumference of the target object. Alternatively or additionally, the three-dimensional model is a NeRF model. The above examples are only used for describing the present disclosure, and are not intended to specifically define the present disclosure.

At block 306, a target image is selected from the set of images based on similarities between images in the set of images and the query image. For example, the computing device 104 selects from the set of images an image that has the highest similarity with the query image.

In some embodiments, when selecting the target image from the set of images, the computing device 104 calculates the similarity between each image in the set of images and the query image. The computing device 104 then selects, based on the similarities, an image having the highest similarity from the set of images as the target image. For example, the computing device 104 sorts the set of images based on the calculated similarities, and then selects the image having the highest similarity from the sorted set of images.

In some embodiments, when determining the similarity between each image in the set of images and the query image, the computing device first determines feature points in each image and the query image, and pairs feature points in each image with feature points in the query image. Then, the computing device may determine the similarity between the two images based on the number of matching feature points in each image and the query image. The above examples are only used for describing the present disclosure, and are not intended to specifically define the present disclosure. A person skilled in the art can use any suitable method to determine the similarity between two images.

At block 308, a target camera pose corresponding to the query image is determined based on a camera pose for the target image. For example, the computing device 104 may determine the target camera pose corresponding to the query image 102 based on the camera pose for the target image. For descriptive convenience, the previously described set of images is also referred to as a first set of images, the target image is also referred to as a first target image, and the camera pose is also referred to as a first camera pose.

When determining the target camera pose corresponding to the query image 102, the computing device 104 first determines the first camera pose for the target image. The computing device then further acquires, based on the first camera pose, a second set of images around a camera position corresponding to the first camera pose from the three-dimensional model. For example, since the target image is highly similar to the query image, the target camera pose for the query image is in the vicinity of this first camera pose. At this time, the computing device determines, based on the first camera pose, the camera position where this first target image is located, and then acquires a second set of images in the vicinity of this camera position. For example, the second set of images is obtained by selecting a plurality of positions or a plurality of poses within the circumference around the camera position. The computing device then calculates the similarities between images in the second set of images and the query image and selects a second target image with the highest similarity from the second set of images. The computing device 104 determines a target camera pose corresponding to the query image based on a second camera pose for the second target image as well as the query image. Alternatively or additionally, the computing device may further determine a third set of images based on the second camera pose, and then determine the target camera pose corresponding to the query image based on the third set of images and the query image. In this manner, multiple rounds of selection operations may be performed to determine an image with the highest similarity. The target camera pose is then determined in accordance with the camera pose for the image with the highest similarity as well as the query image.

In some embodiments, the computing device 104 determines the target camera pose corresponding to the query image 102 directly according to the first camera pose and the query image 102. The above examples are only used for describing the present disclosure, and are not intended to specifically define the present disclosure.

In some embodiments, the computing device uses, for example, a computational technique such as that illustrated by Equation (2) herein, to determine the target camera pose corresponding to the query image using the query image and the camera pose for the image with the highest similarity. In some embodiments, the computing device finds the target camera pose corresponding to the query image according to the query image and the camera pose for the image with the highest similarity based on a predetermined mapping relationship. The above examples are only used for describing the present disclosure, and are not intended to specifically define the present disclosure. A person skilled in the art can use any suitable method to determine the target camera pose according to the query image and the camera pose for the image with the highest similarity.

In some embodiments, after obtaining the target camera pose, the computing device further acquires a reference image corresponding to the target camera pose from the three-dimensional model according to the target camera pose. For example, the target camera pose is input to a NeRF model to obtain the reference image.

In some embodiments, the computing device may also determine the difference between the query image and the reference image according to the query image and the reference image. The difference is then presented on a display device. For example, the computing device compares the query image and the reference image to determine the difference, and then presents this difference on a display device for reference by the user.

In some embodiments, the computing device 104 can further generate a three-dimensional model for the target object. Specifically, the computing device 104 first receives a plurality of images for the target object. The computing device then generates a three-dimensional model based on the plurality of images.

In some embodiments, when generating a three-dimensional model, the computing device first obtains three-dimensional point cloud data for the target object based on the plurality of images, for example, using the SFM method to process the plurality of images to obtain the three-dimensional point cloud data. The computing device then generates a three-dimensional model based on the three-dimensional point cloud data. For example, the computing device uses the three-dimensional point cloud data for NeRF modeling processing to generate a three-dimensional model.

In some embodiments, where the target object is a part of the region in the image, the computing device may first generate three-dimensional point cloud data for a complete object corresponding to the plurality of images according to the plurality of images. The three-dimensional point cloud data for the target object is then selected from the three-dimensional point cloud data for the complete object. The selected three-dimensional point cloud data is then used to generate a three-dimensional model for the target object. For this process, reference can be made to the description of FIG. 4A and FIG. 5A below.

In some embodiments, when obtaining the three-dimensional point cloud data for the target object, an image portion corresponding to the target object may first be selected from each image of the plurality of images. The selected image portion from each image is then used to generate the three-dimensional point cloud data for that target object. The three-dimensional point cloud data is then used to generate the three-dimensional model for the target object. For this process, reference can be made to the description of FIG. 4B and FIG. 5B below.

The method enables fast and accurate determination of a camera pose for a query image from a three-dimensional model for a target object, thus increasing the efficiency of acquiring the camera pose and improving the user experience.

The end-to-end three-dimensional model training process for the three-dimensional model used above is described in detail below, so as to enable the user to generate a three-dimensional model for a target scene directly based on a plurality of input images of the target scene. For example, the SFM process can be embedded into the NeRF process during the generation of the three-dimensional model for the target object so as to enable an end-to-end two-dimensional image to three-dimensional model process. For example, it is possible to further establish an application programming interface that takes two-dimensional images as input, and then use a Colmap method for pre-processing to extract initial pairs of two-dimensional feature points and three-dimensional spatial coordinates, and then output a camera pose file for use in NeRF model training. The following pseudo code illustrates the core used to implement the end-to-end NeRF model training process:

```
# Reading a plurality of images as a list
img_list=[np.array(x)]
#Starting the Colmap service and setting parameters
Colamp=sfm.colmap(gpu=true, matcher=exhaustive_matcher)
#Processing images
camera_pose=Colmap(img_list)
#Storing camera and image files to a camera.npy file
Output=np.save([camera_pose, img_list], file_name= "camera.npy")
#Starting the NeRF service
Nerf=nerf.mode_train( )
#Optimizing the NeRF, and computing a loss function using image pixels
and camera poses
pixel, pose=np.load('camera.npy')
Loss=L1_loss(pixel, Nerf(pose))
```

The "camera.npy" obtained in the pseudo code can be read directly by the NeRF model for training. Then, the NeRF model that can calibrate the initial camera pose is trained, so as to further improve the image matching accuracy. This process also leads to better three-dimensional reconstruction. A three-dimensional rigid transformation can be used to fine-tune the image pixels. First, the initial NeRF model calculation is implemented by the following Equation (1):

$$I(u) = \int_{z_{near}}^{z_{far}} T(u, z)\sigma(z)c(z)dz \qquad (1)$$

where $u \in \mathbb{R}^2$ is the pixel coordinate, and z is the depth. $T(u, z) = \exp(-\int_{z_{near}}^{z}\sigma(z')dz')$ denotes the accumulated transmittance along the ray from $z_{near}$ to z, and I(u) is the color at coordinate u. $z_{near}$ and $z_{far}$ are the boundaries of the depth range of interest. $\sigma(z)$ is the density, and c(z) is the color at depth z. N points with depths $z_1$, $z_2$, . . . , and $z_N$ are given. First, I(u) in Equation (1) is simplified to $y = f(z; \Theta)$, and then the pose function $g(f(W(z; p); \Theta))$ is learned to adjust the camera pose (note that the NeRF model parameter $\Theta$ is fixed, and only W is learned for pose estimation). Six-degrees of freedom (6-DoF) camera pose parameterization can be introduced by $p \in \mathbb{R}^6$ and the three-dimensional point x in the camera view space can be converted to three-dimensional world coordinates by a three-dimensional rigid transformation $W: \mathbb{R}^3 \to \mathbb{R}^3$.

Thus, the Red, Green, Blue (RGB) colors synthesized at pixel u are represented by the following Equation (2):

$$I(u; p) = g(f(W(z_1; p_0); \Theta)), \ldots, f(W(z_N; p_0); \Theta) \qquad (2)$$

In some embodiments, M images $l_{i_{i=1}}^M$ are given, and the objective is to optimize the NeRF model and the camera pose $p_{i_{i=1}}^M$ on a synthesis-based target, where $p_0$ is the camera pose of the image that can have the highest similarity with the target image. The mean pixel color difference optimized for the NeRF model is calculated using Mean-Square Error (MSE) or L1 loss.

Figures 4A, 4B:
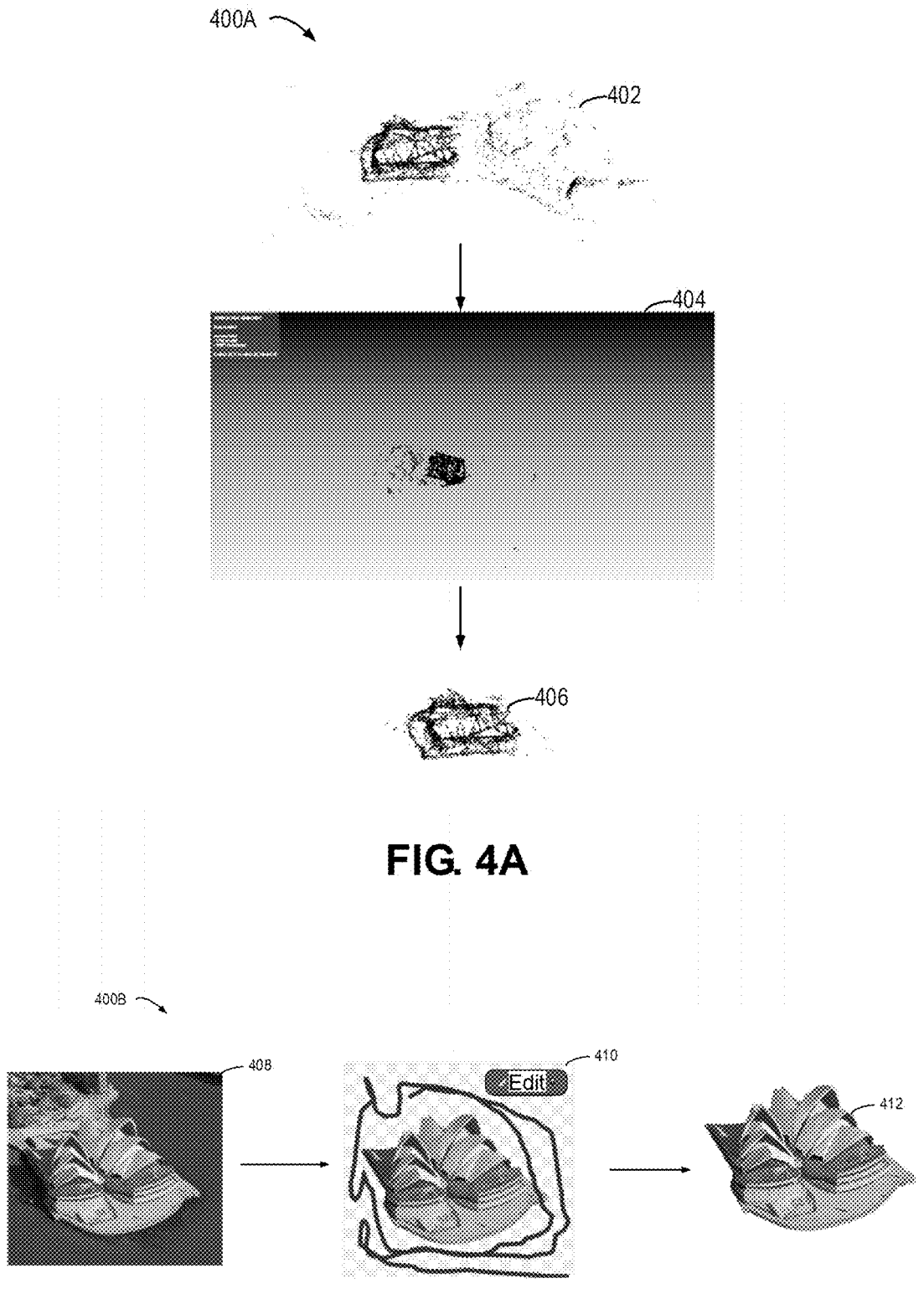
FIG. 4A is a schematic diagram of an example process for determining a target object according to embodiments of the present disclosure.
FIG. 4B is a schematic diagram of another example process for determining a target object according to embodiments of the present disclosure.

The end-to-end NeRF model training process can provide the user with more degrees of freedom in scene editing. The user can define a region of interest for three-dimensional modeling before or after the SFM process, so that the user can train a NeRF model dedicated to target regions or target objects, as shown in FIG. 4A and FIG. 4B. Among them, FIG. 4A is a schematic diagram of an example process 400A for determining a target object according to embodiments of the present disclosure, which allows the user to change the SFM point cloud. For example, an online point cloud application can be used to open a "camera.npy" file to allow the user to select three-dimensional points for modeling. Those points that are excluded are then filtered out, and the NeRF model is trained accordingly. As shown in the example process 400A in FIG. 4A, the user can use a plurality of images to generate a point cloud 402 of an overall region or complete object, which can then be presented in a user interface 404 for the user to select a point cloud for the target region or target object, such as selecting a point cloud with a dark color as point cloud data 406 for the target object selected from the complete object for use in later NeRF model processing.

FIG. 4B is a schematic diagram of another example process for determining a target object according to embodiments of the present disclosure. As illustrated in an example process 400B in FIG. 4B, for each image 408 used to generate the NeRF model, it is possible to choose to edit each image by identifying which portion is the background and which is the foreground via an image editing interface 410. In addition, the target region is selected to generate a selected target object image 412. A plurality of target object images selected from the plurality of images are then used to generate a point cloud for the target object, which is then used to generate the NeRF model. When training the NeRF model, a binary mask for removing the image portion can be added to the loss term.

Figures 5A, 5B:
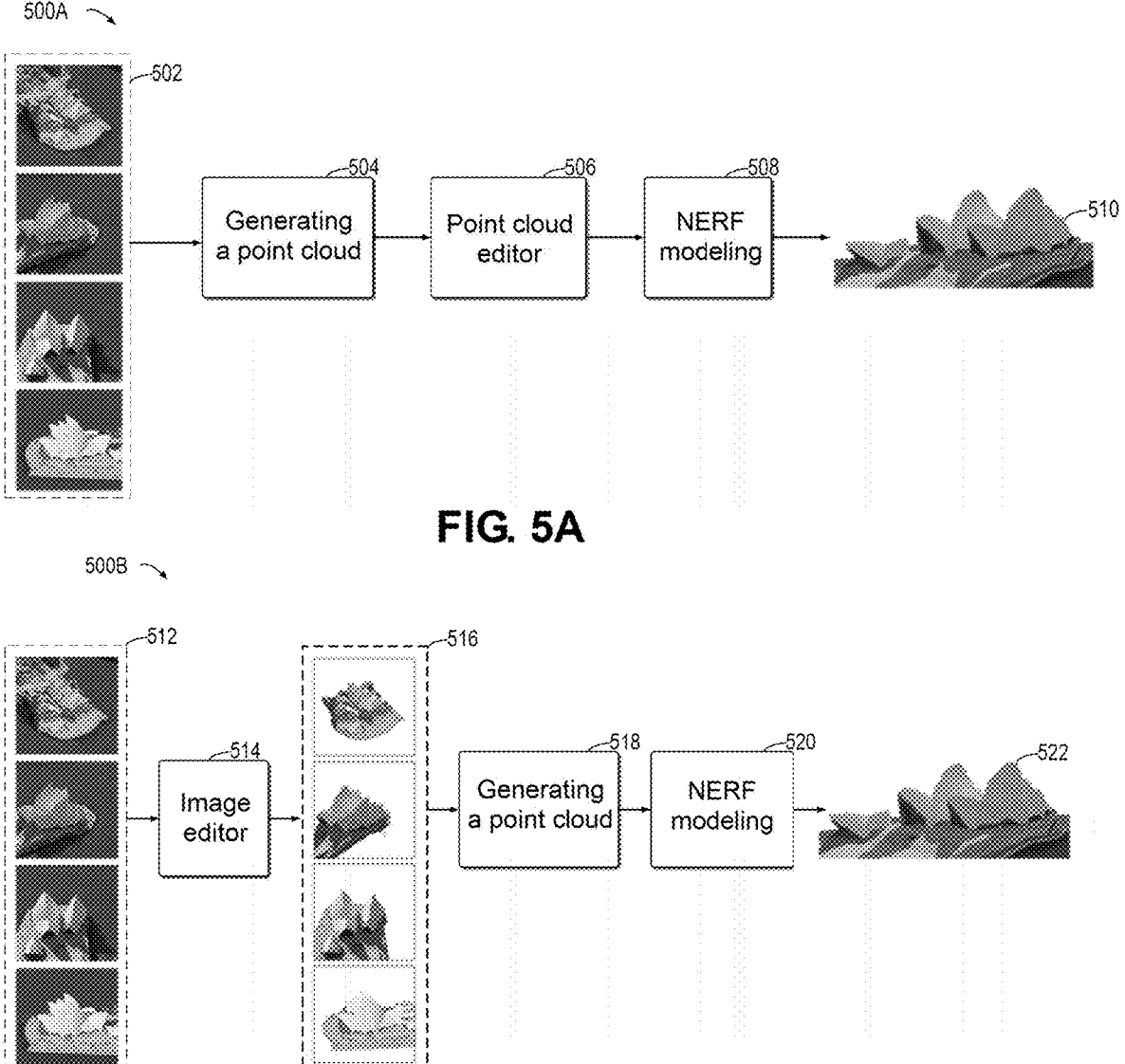
FIG. 5A is a schematic diagram of an example process for generating a three-dimensional model for an object according to embodiments of the present disclosure.
FIG. 5B is a schematic diagram of another example process for generating a three-dimensional model for an object according to embodiments of the present disclosure.

FIG. 5A and FIG. 5B illustrate the processes of generating a NeRF model corresponding to the above two methods. As shown in FIG. 5A, a point cloud corresponding to a plurality of images 502 is generated at block 504 using the plurality of images 502 in example process 500A. The point cloud is then edited by a point cloud editor 506, for example, by selecting a point cloud for a target region or target object, and then the NeRF modeling processing is performed at block 508 to finally obtain a three-dimensional model 510 for the selected target region or target object. As shown in FIG. 5B, in the example process 500B, a plurality of images 512 are input to an image editor 514, and the user can then edit the images, for example, by selecting a target region or target object, thereby generating a plurality of images 516 that include the target region or target object. The plurality of images 516 are then processed, and at block 518, a point cloud is generated for the plurality of images 516, and then NeRF modeling processing is performed at block 520 to finally generate a three-dimensional model 522 for the target object.

Figure 6:
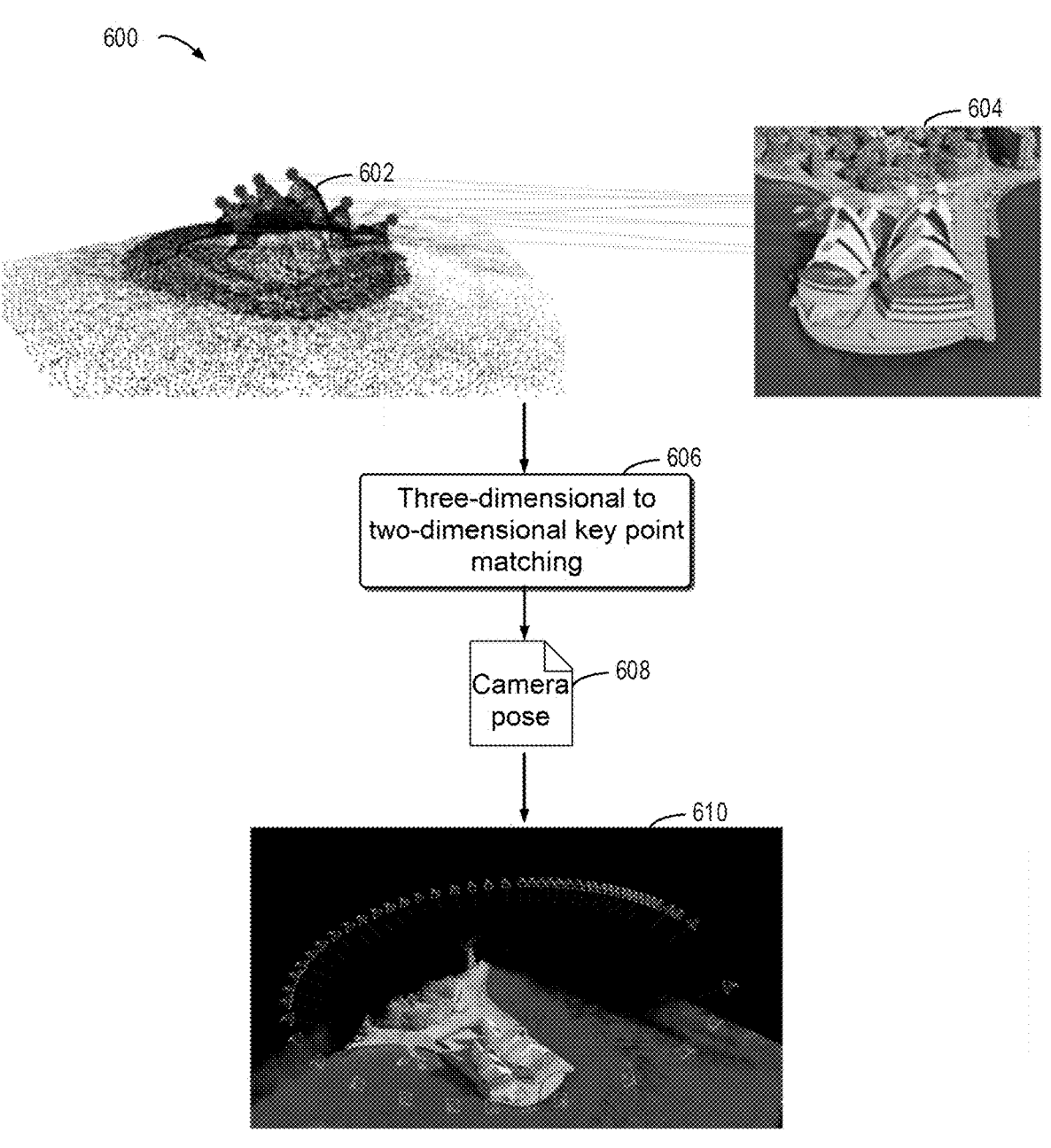
FIG. 6 is a schematic diagram of an example process for determining an image corresponding to a camera pose according to embodiments of the present disclosure.

In addition, after the three-dimensional model is obtained, the three-dimensional model can be used for object localization and matching. That is, given a well-trained NeRF model, a query image for a target object can be matched with a three-dimensional model for the target object, so as to perform camera pose retrieval and feature matching. This has tremendous applications in real life. For example, when holding a photo of New York's Fifth Avenue taken ten years ago, one is now walking on the same street trying to find the exact spot where the photo was taken. Given that thousands of photos can be taken for the same object at different angles and lighting conditions, illustrative embodiments can find the most robust and representative key points and use them to match with prior knowledge. In the example, the images are matched with a three-dimensional model. As shown in example process 600 of FIG. 6, pairs of key points $X \in \mathbb{R}^2 \to Y \in \mathbb{R}^3$ are found, where X is a two-dimensional pixel, and Y is a three-dimensional point cloud. For example, key points in a three-dimensional point cloud 602 and a query image 604 are determined. Then, at block 606, a three-dimensional to two-dimensional key point matching is performed. To find the matching pairs, two-dimensional feature vectors in the image and the three-dimensional model are extracted and aligned according to a K-nearest neighbor (KNN) algorithm. A camera pose 608 for the query image 604 can then be determined, so that an image corresponding to that camera pose can be determined from a three-dimensional model 610.

Figure 7:
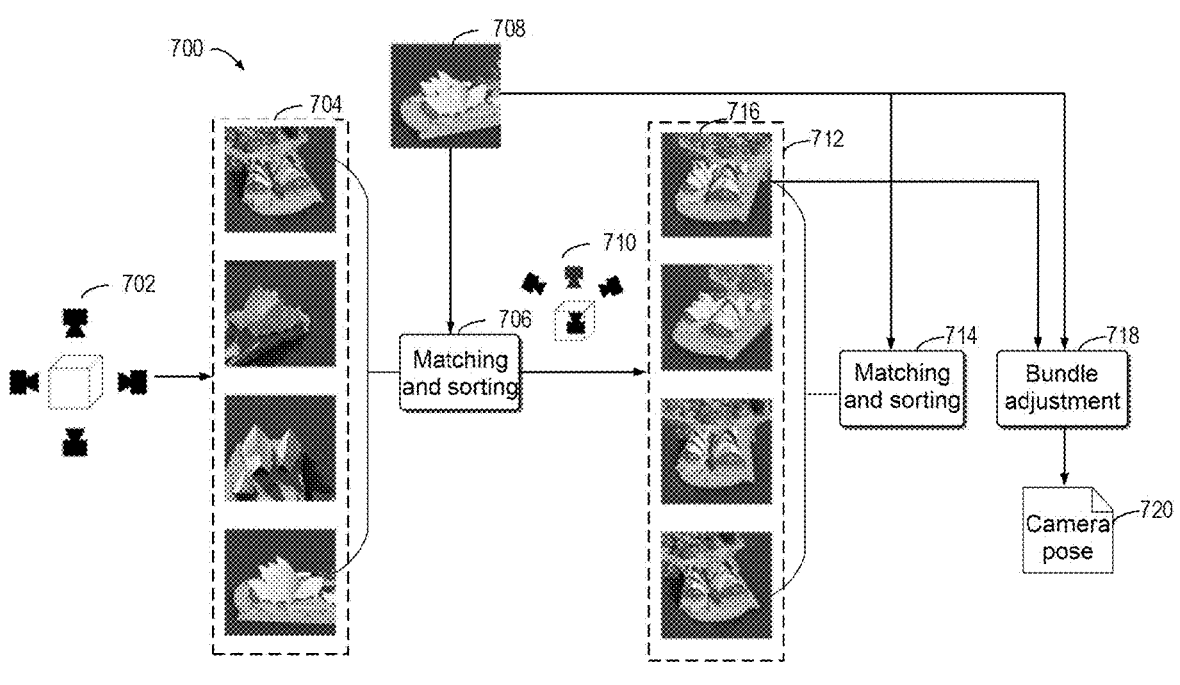
FIG. 7 is a schematic diagram of an example process for determining a camera pose according to embodiments of the present disclosure.

Since a three-dimensional point cloud can draw an infinite number of two-dimensional views, it is difficult to retrieve the correct camera pose. To solve this problem, a two-stage matching process is illustrated in FIG. 7, which is a schematic diagram of an example process 700 for determining a camera pose according to embodiments of the present disclosure. In the example process 700, firstly, at 702, four views are sampled uniformly around the horizontal 360° of a three-dimensional model to capture four images 704. Then, at block 706, matching and sorting is performed using two-dimensional feature vectors. The matching results are sorted in order to find the top view with the most feature matching pairs. Next, as shown at 710, the camera is calibrated to the top view angle to capture the other four images 712 around it. The same matching and sorting process is then used at block 714 to select the best matching image, for example, an image 716. Next, the matching image and the query image are used to perform a bundle adjustment 718 through a NeRF model, which is similar to the process described in Equation (2), except that the network parameter $\Theta$ is fixed and only an estimated camera pose 720 is returned.

Figure 8:
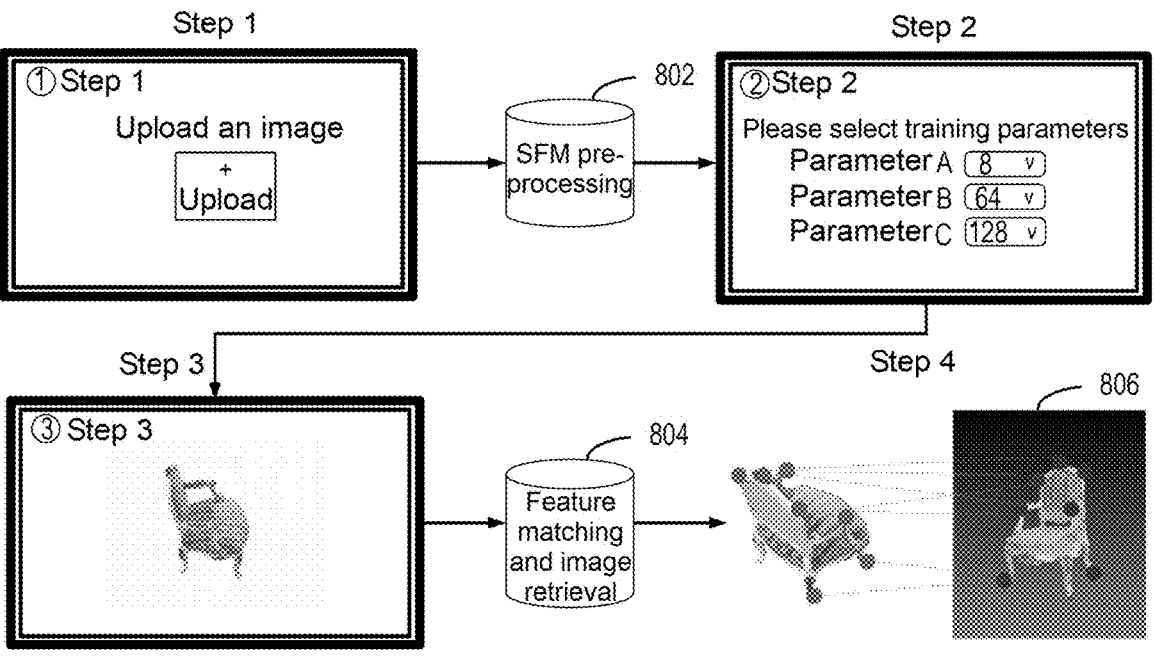
FIG. 8 is a schematic diagram of an example process for retrieving an image according to embodiments of the present disclosure.

The end-to-end two-dimensional to three-dimensional modeling process and the framework for performing image matching are described above. Thus, it is possible for the user to upload a photo and directly obtain a final three-dimensional file, and to determine the camera pose for the query image. The entire pipeline can be implemented through web page visualization. FIG. 8 is a schematic diagram of an example process 800 for retrieving an image according to embodiments of the present disclosure. As shown in FIG. 8, in the example process 800, at step 1, a web page that allows a user to upload a photo online is provided. SFM pre-processing 802 is then performed to define a region of interest and optimize the data. In step 2, training is started based on parameters set by the user. In step 3, a three-dimensional model is returned to the user. In step 4, the user can capture a new image 806 and match it with the three-dimensional model for feature matching and image retrieval 804 to determine the camera pose for the new image or find an image corresponding to the new image.

The method enables the generation of an end-to-end three-dimensional model, and enables fast and accurate determination of the camera pose for the query image from the three-dimensional model for the target object, thus increasing the efficiency of acquiring the camera pose and improving the user experience.

Further, FIG. 9 is a schematic diagram of a usage example 900 of a three-dimensional model according to embodiments of the present disclosure. In FIG. 9, if a user 902 encounters a problem during the installation of a computer, he or she may send an image of the relevant component, such as an image of a desktop computer component, to a customer service agent 904. The customer service agent 904 can then first acquire a three-dimensional model corresponding to that desktop computer. The method described previously is then used to perform matching and retrieval on the corresponding three-dimensional model and the image sent by the user 902, so as to obtain a reference image of the camera pose corresponding to the image from the user. Next, the image sent by the user 902 is compared with the found reference image to determine the difference between the image sent by the user 902 and the reference image acquired by the three-dimensional model. A computing device at the customer service side can further display the difference in the reference image and then send it to the user for reference. In this way, guidance is provided for the installation process for the user to help him/her complete the installation of the component.

The method enables fast and accurate determination of a reference image for a query image from a three-dimensional model for a target object, thus increasing the efficiency of problem solving and improving the user experience.

FIG. 10 is a block diagram of an example device 1000 that can be used to implement embodiments of the present disclosure. The computing device 104 in FIG. 1 may be implemented using the device 1000. As shown in the figure, the device 1000 includes a central processing unit (CPU) 1001 that may execute various appropriate actions and processing according to computer program instructions stored in a read-only memory (ROM) 1002 or computer program instructions loaded from a storage unit 1008 to a random access memory (RAM) 1003. Various programs and data required for the operation of the device 1000 may also be stored in the RAM 1003. The CPU 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including: an input unit 1006, such as a keyboard and a mouse; an output unit 1007, such as various types of displays and speakers; a storage unit 1008, such as a magnetic disk and an optical disc; and a communication unit 1009, such as a network card, a modem, and a wireless communication transceiver. The communication unit 1009 allows the device 1000 to exchange information/data with other devices via a computer network, such as the Internet, and/or various telecommunication networks.

The various processes and processing described above, such as the process or method 300 and the processes 400A, 400B, 500A, 500B, 600, 700, and 800, may be performed by the CPU 1001. For example, in some embodiments, the method 300 and the processes 400A, 400B, 500A, 500B, 600, 700, and 800 may be implemented as a computer software program that is tangibly contained in a machine-readable medium, such as the storage unit 1008. In some embodiments, part or all of the computer program may be loaded and/or installed onto the device 1000 via the ROM 1002 and/or the communication unit 1009. When the computer program is loaded into the RAM 1003 and executed by the CPU 1001, one or more of the actions of the process or method 300 and the processes 400A, 400B, 500A, 500B, 600, 700, and 800 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for determining a camera pose for an image, comprising:

acquiring a query image for a target object;

acquiring a set of images from a three-dimensional model for the target object;

selecting a target image from the set of images based on similarities between images in the set of images and the query image; and determining a target camera pose corresponding to the query image based on a camera pose for the target image;

wherein acquiring the set of images, selecting the target image, and determining the target camera pose corresponding to the query image further comprise implementing a multi-stage process that comprises:

in a first stage of the multi-stage process, sampling images from the three-dimensional model for a first number of views around a periphery of the three-dimensional model, and performing matching and sorting of the sampled images based on similarities of the respective sampled images to the query image to identify from the sampled images a first sampled image most similar to the query image; and in a second stage of the multi-stage process, sampling additional images from the three-dimensional model for a second number of views relative to a position of the first sampled image identified in the first stage, and repeating the matching and sorting for the additional sampled images based on similarities of the respective additional sampled images to the query image to identify from the additional sampled images a second sampled image most similar to the query image;

wherein the three-dimensional model is adjusted based on the second sampled image.

2. The method according to claim 1, wherein acquiring a set of images comprises:

extracting the target object in the query image;

determining the three-dimensional model for the target object based on the target object; and acquiring a set of images of the target object from the three-dimensional model, the set of images being images of the target object viewed from surroundings of the target object.

3. The method according to claim 1, wherein selecting a target image from the set of images comprises:

determining a similarity between each image of the set of images and the query image; and selecting, based on the similarities, an image having the highest similarity from the set of images as the target image.

4. The method according to claim 3, wherein determining a similarity between each image of the set of images and the query image comprises:

determining feature points in said each image and the query image; and determining the similarity based on the number of matching feature points in said each image and the query image.

5. The method according to claim 1, wherein the set of images is a first set of images, the target image is a first target image, and the camera pose is a first camera pose, and wherein determining a target camera pose corresponding to the query image comprises:

determining the first camera pose for the target image;

acquiring, based on the first camera pose, a second set of images around a camera position corresponding to the first camera pose from the three-dimensional model;

selecting a second target image from the second set of images based on similarities between images in the second set of images and the query image; and determining the target camera pose corresponding to the query image based on a second camera pose for the second target image.

6. The method according to claim 1, further comprising:

acquiring, based on the target camera pose, a reference image corresponding to the target camera pose from the three-dimensional model.

7. The method according to claim 6, further comprising:

determining, based on the query image and the reference image, a difference between the query image and the reference image; and presenting the difference on a display device.

8. The method according to claim 1, further comprising:

receiving a plurality of images for the target object; and generating the three-dimensional model based on the plurality of images.

9. The method according to claim 8, wherein generating the three-dimensional model comprises:

obtaining three-dimensional point cloud data for the target object based on the plurality of images; and generating the three-dimensional model based on the three-dimensional point cloud data.

10. The method according to claim 9, wherein obtaining three-dimensional point cloud data for the target object comprises:

generating three-dimensional point cloud data for a complete object corresponding to the plurality of images based on the plurality of images; and selecting the three-dimensional point cloud data for the target object from the three-dimensional point cloud data for the complete object.

11. The method according to claim 9, wherein obtaining three-dimensional point cloud data for the target object comprises:

selecting an image portion corresponding to the target object from each image of the plurality of images; and generating the three-dimensional point cloud data for the target object based on the selected image portion.

12. The method according to claim 1, wherein the three-dimensional model comprises a neural radiance field (NeRF) model.

13. An electronic device, comprising:

at least one processor; and memory coupled to the at least one processor and having instructions stored therein, wherein the instructions, when executed by the at least one processor, cause the electronic device to perform actions comprising:

acquiring a query image for a target object;

acquiring a set of images from a three-dimensional model for the target object;

selecting a target image from the set of images based on similarities between images in the set of images and the query image; and determining a target camera pose corresponding to the query image based on a camera pose for the target image;

wherein acquiring the set of images, selecting the target image, and determining the target camera pose corresponding to the query image further comprise implementing a multi-stage process that comprises:

in a first stage of the multi-stage process, sampling images from the three-dimensional model for a first number of views around a periphery of the three-dimensional model, and performing matching and sorting of the sampled images based on similarities of the respective sampled images to the query image to identify from the sampled images a first sampled image most similar to the query image; and in a second stage of the multi-stage process, sampling additional images from the three-dimensional model for a second number of views relative to a position of the first sampled image identified in the first stage, and repeating the matching and sorting for the additional sampled images based on similarities of the respective additional sampled images to the query image to identify from the additional sampled images a second sampled image most similar to the query image;

wherein the three-dimensional model is adjusted based on the second sampled image.

14. The electronic device according to claim 13, wherein acquiring a set of images comprises:

extracting the target object in the query image;

determining the three-dimensional model for the target object based on the target object; and acquiring a set of images of the target object from the three-dimensional model, the set of images being images of the target object viewed from surroundings of the target object.

15. The electronic device according to claim 13, wherein selecting a target image from the set of images comprises:

determining a similarity between each image of the set of images and the query image; and selecting, based on the similarities, an image having the highest similarity from the set of images as the target image.

16. The electronic device according to claim 15, wherein determining a similarity between each image of the set of images and the query image comprises:

determining feature points in said each image and the query image; and determining the similarity based on the number of matching feature points in said each image and the query image.

17. The electronic device according to claim 13, wherein the set of images is a first set of images, the target image is a first target image, and the camera pose is a first camera pose, and wherein determining a target camera pose corresponding to the query image comprises:

determining the first camera pose for the target image;

acquiring, based on the first camera pose, a second set of images around a camera position corresponding to the first camera pose from the three-dimensional model;

selecting a second target image from the second set of images based on similarities between images in the second set of images and the query image; and determining the target camera pose corresponding to the query image based on a second camera pose for the second target image.

18. The electronic device according to claim 13, wherein the actions further comprise:

acquiring, based on the target camera pose, a reference image corresponding to the target camera pose from the three-dimensional model.

19. The electronic device according to claim 18, wherein the actions further comprise:

determining, based on the query image and the reference image, a difference between the query image and the reference image; and presenting the difference on a display device.

20. A computer program product comprising a non-transitory computer-readable medium having machine-executable instructions stored therein, wherein the machine-executable instructions, when executed by a machine, cause the machine to perform actions comprising:

acquiring a query image for a target object;

acquiring a set of images from a three-dimensional model for the target object;

selecting a target image from the set of images based on similarities between images in the set of images and the query image; and determining a target camera pose corresponding to the query image based on a camera pose for the target image;

wherein acquiring the set of images, selecting the target image, and determining the target camera pose corresponding to the query image further comprise implementing a multi-stage process that comprises:

in a first stage of the multi-stage process, sampling images from the three-dimensional model for a first number of views around a periphery of the three-dimensional model, and performing matching and sorting of the sampled images based on similarities of the respective sampled images to the query image to identify from the sampled images a first sampled image most similar to the query image; and in a second stage of the multi-stage process, sampling additional images from the three-dimensional model for a second number of views relative to a position of the first sampled image identified in the first stage, and repeating the matching and sorting for the additional sampled images based on similarities of the respective additional sampled images to the query image to identify from the additional sampled images a second sampled image most similar to the query image;

wherein the three-dimensional model is adjusted based on the second sampled image.

* * * * *